July 6, 1926.
C. MARCH
FLYCATCHER
Filed March 6, 1926
1,591,854
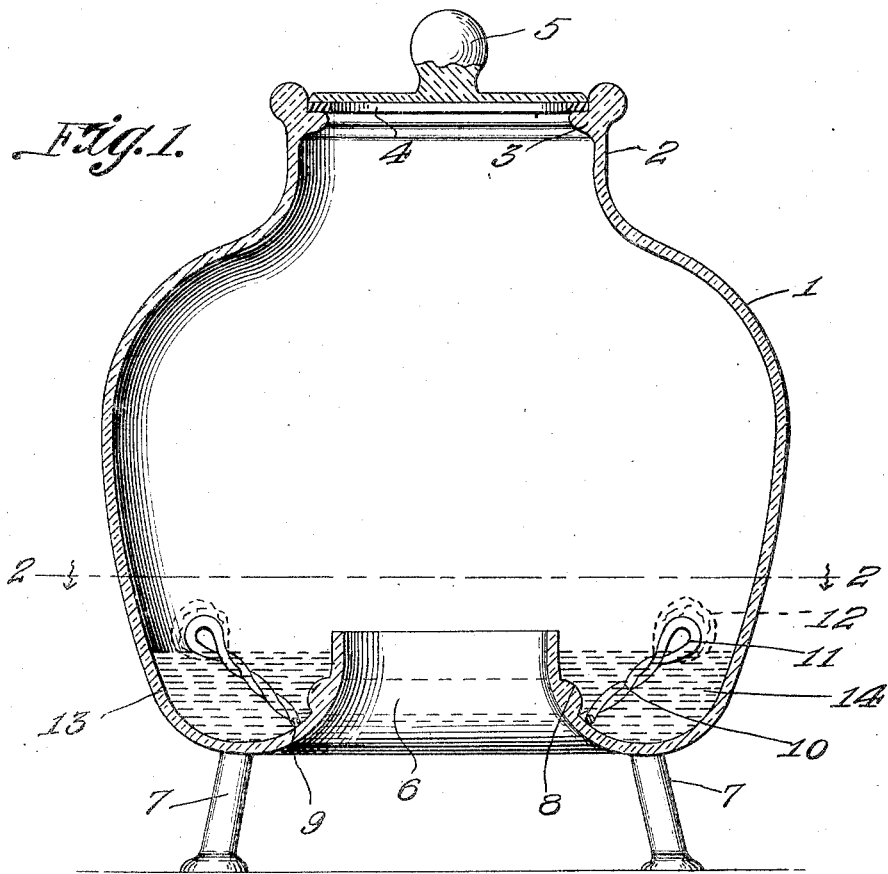
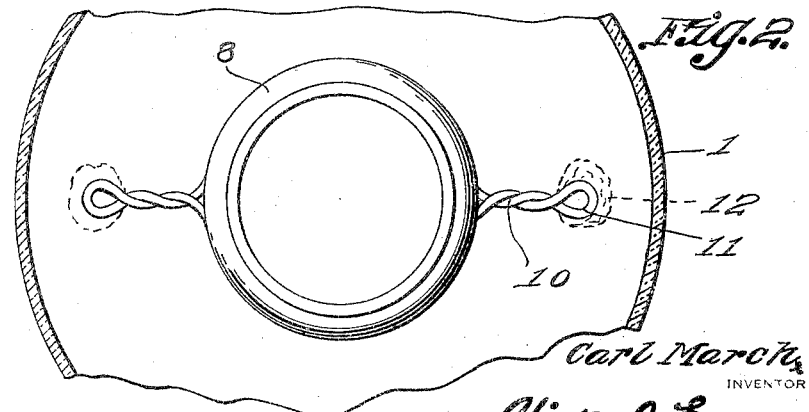
Carl March
INVENTOR
BY Victor J. Evans
ATTORNEY Patented July 6, 1926.

1,591,854

UNITED STATES PATENT OFFICE.

CARL MARCH, OF CHICAGO, ILLINOIS.

FLYCATCHER.

Application filed March 6, 1926. Serial No. 92,820.

This invention has reference to fly traps, and an object is to provide a fly trap of artistic appearance and which comprises a body of glass or other suitable material centrally formed at its bottom with an inwardly rounded outwardly extended flange that provides the bottom of the receptacle with a chamber for fluid which may be in the nature of a fly destroying agent and around which flange there is fixed the body portion of a holder for bait that is designed to attract the insects.

To the attainment of the foregoing the invention consists in the improvement as hereinafter described and definitely claimed.

In the drawings:

Figure 1 is a vertical sectional view through the improved trap.

Figure 2 is a sectional view on the line 2—2 of Figure 1.

The body 1 of the trap is constructed of glass or other suitable transparent material and as shown in the drawings the body is gracefully curved from the bottom to the top thereof, the said body being provided with a neck extension 2 having an inturned flange 3 on which is seated a gasket 4 and on which ring gasket rests the removable cover 5 which is also of a suitable transparent material.

The bottom of the body 1 is rounded upwardly and inwardly to provide a flange 6 which is round in plan. The opening provided by the flange 6 affords an entrance for the insects, as the bottom of the body is provided with legs 7, whereby the bottom of the said body is retained at a desired elevation.

The flange 6, on its inner face is formed with an annular boss 8 and this boss is designed to serve as a contact element for a ring 9. The ring may and preferably is constructed from a strand of wire, the said ring being provided with angularly extending outwardly directed arms 10 that terminate in either jaws or eyes 11, and on these portions 11 the bait for the insects is attached.

In the compartment 13 provided between the inwardly directed flange 6 and the bottom of the body 1 there is a fluid body 14. This body may be in the nature of an insect destroyer or may be in the nature of water, milk, or any other fluid which will attract insects but which will cause the drowning of such insects when submerged in the said fluid. The level of the fluid body is a considerable distance below the outer end of the flange 6.

In using the device the stopper is removed for arranging the ring 9 in the depression formed between the neck and the inner wall of the angular enlargement 8 so that bait may be placed on the ends of the arms 10 and likewise so that the fluid 14 may be received in the basin 13. Insects, especially flies, have a natural tendency to move in an upward direction and the aroma from the bait and the fluid 14 will attract the insects to cause them to pass through the flange 6 into the body. The insects will naturally eat the bait and as the bait is of a poisonous nature the insects will fall into the fluid 14 and drown.

The simplicity and artistic appearance of my improvement will be appreciated to those skilled in the art to which this invention relates although I do not wish to be restricted to the employment of a hollow body of the precise size and shape as disclosed by the drawings, nor do I wish to be restricted in other details of construction as such changes may be resorted to as fairly fall within the scope of what I claim.

Having described the invention, I claim:

In an insect trap, a hollow transparent body, having a neck portion designed to be closed by a removable stopper and having supporting legs depending from the bottom thereof, the bottom of the body being formed with an inwardly rounded outwardly extending flange providing an entrance to the body, said flange having an annular enlargement thereon, a metal ring member designed to be sprung over the enlargement and to frictionally contact with the inner walls thereof, angle arms on the ring designed to have bait attached to the ends thereof and a portion of the body below the mouth of the inwardly directed flange forming a basin for a fluid.

In testimony whereof I affix my signature.

CARL MARCH.